United States Patent
Babashetty et al.

(10) Patent No.: US 9,489,268 B2
(45) Date of Patent: Nov. 8, 2016

(54) SYSTEM AND METHOD TO PROACTIVELY MAINTAIN A CONSISTENT RECOVERY POINT OBJECTIVE (RPO) ACROSS DATA CENTERS

(71) Applicant: Sanovi Technologies Pvt. Ltd., Bangalore, Karnataka (IN)

(72) Inventors: Sharanabasappa Babashetty, Bangalore (IN); Devendra Garg, Bangalore (IN); Rajasekhar Vonna, Bangalore (IN); Sukumar Madawat, Bangalore (IN)

(73) Assignee: SANOVI TECHNOLOGIES PVT. LTD., Bangalore (IN)

( * ) Notice: Subject to any disclaimer, the term of this patent is extended or adjusted under 35 U.S.C. 154(b) by 250 days.

(21) Appl. No.: 14/164,665

(22) Filed: Jan. 27, 2014

(65) Prior Publication Data

US 2014/0297588 A1 Oct. 2, 2014

(30) Foreign Application Priority Data

Apr. 1, 2013 (IN) ............................ 1467/CHE/2013

(51) Int. Cl.
*G06F 7/00* (2006.01)
*G06F 17/00* (2006.01)
*G06F 11/14* (2006.01)
*G06F 11/30* (2006.01)

(52) U.S. Cl.
CPC ....... *G06F 11/1458* (2013.01); *G06F 11/1464* (2013.01); *G06F 11/302* (2013.01); *G06F 11/3027* (2013.01); *G06F 2201/81* (2013.01)

(58) Field of Classification Search
None
See application file for complete search history.

(56) References Cited

U.S. PATENT DOCUMENTS

| | | | |
|---|---|---|---|
| 7,577,805 B2* | 8/2009 | Amano | G06F 11/1471 707/999.202 |
| 8,055,866 B2* | 11/2011 | Haustein | G06F 11/2071 707/659 |
| 8,332,354 B1* | 12/2012 | Chatterjee | G06F 11/1461 707/624 |
| 2006/0129562 A1 | 6/2006 | Pulamarasetti et al. | |
| 2012/0137173 A1* | 5/2012 | Burshan | G06F 9/45533 714/15 |
| 2013/0036091 A1* | 2/2013 | Provenzano | G06F 17/30162 707/624 |

* cited by examiner

*Primary Examiner* — Tuan A Pham
(74) *Attorney, Agent, or Firm* — Pearne & Gordon LLP

(57) ABSTRACT

A system and method for proactively monitoring and maintaining a consistent recovery point objective (RPO) across data centers, the system comprising: one or more RPO Management Server(s) logically connected to one or more Production Sites and one or more Disaster Recovery Sites; a Network connecting the said RPO Management Server(s) with the said Production Site and the said Disaster Recovery Site wherein the said RPO Management Server is provided with at least one RPO Manager, at least one Disaster Recovery Management (DRM) System and at least one Replication Management System.

10 Claims, 9 Drawing Sheets

SYSTEM AND METHOD TO PROACTIVELY MAINTAIN A CONSISTENT RECOVERY POINT OBJECTIVE (RPO) ACROSS DATA CENTERS

CROSS-REFERENCE TO THE RELATED APPLICATION

This application claims priority from Indian Patent Application No. 1467/CHE/2013 dated Apr. 1, 2013 the entire disclosure of which is incorporated herein by reference.

FIELD OF THE INVENTION

The present invention generally relates to computing system environment. In particular, the present invention relates to system and method for proactively and intelligently monitoring and maintaining a consistent Recovery Point Objective (RPO) levels in a computing system environment such as IT enterprises. More particularly, the present invention relates to system and method for proactively and intelligently monitoring and maintaining consistent RPO levels in a computing system environment by altering and adjusting the replication rates of the application(s) based on the RPO goals in a computing system environment such as IT enterprises.

BACKGROUND OF THE INVENTION

Business Enterprises are dependent on computing system environments for maintaining their business continuity. Such business enterprises can be broadly termed as IT enterprises. The existence of IT enterprises is dependent on their Business Continuity and Disaster Recovery Management infrastructure and its effective implementation.

Disaster Recovery is the process of reinstituting access to data, application, and hardware systems that are critical to resume business operations in the wake of a disaster that has disrupted normal business operations. A Disaster Recovery Plan should include information that not only pertains to the resumption of normal systematic operations post disaster, but should also consider other factors such as, not being limited to, meeting a desired Recovery Point Objective ("RPO") and/or meeting a desired Recovery Time Objective ("RTO"), affordability, ease, robustness, reliability, and manageability thereof.

RPO generally refers to an acceptable amount of data loss measured in time relative to when a disaster occurs. More particularly, RPO may represent the point in time from which an IT enterprise should be able to recover stored data. For example, if an IT enterprise establishes the RPO as two hours, the enterprise should be able to recover any stored data that exists at least two hours prior to the disaster.

Information Technology (IT) data centers have hundreds of enterprise applications and many of them are critical for business and are expected to maintain RPO (Recovery Point Objective) goals to ensure business continuity. As number of applications increase, it becomes critical that RPO goals are managed and monitored across the data centers.

To this end, systems and methods for monitoring and maintaining Recovery Point Objective (RPO) are available which involve manual intervention to implement corrective actions in cases of RPO violations/RPO deviations in an IT enterprise. Such systems and methods, apart from requiring extensive technical knowledge of all the components used in the Disaster Recovery solution, also adds to the costs for the IT enterprises that implement such Disaster Recovery solutions. Further, manual intervention is prone to erroneous operations which can be detrimental for business continuity of the IT enterprises using such solutions.

Automated systems are also available for maintaining RPO levels across the data centers of IT enterprises which comprise inputting an RPO value for the solution, calculating a real time RPO value for the solution and making the real time RPO value equal to the input RPO value. However, till date, no automated measures are available that proactively and intelligently alter and adjust the replication parameters of the replicators to maintain consistent RPO levels across the data centers of IT enterprises.

Accordingly, there is a need for a cost effective, affordable, easy, robust, reliable, and manageable system and method for proactively and intelligently monitoring and maintaining RPO levels across the data centers based on the RPO goals of the IT enterprises.

The present invention, therefore, aims at overcoming the aforesaid limitations by providing system and method for proactively and intelligently monitoring and maintaining consistent RPO levels across the data centers based on the RPO goals of the IT enterprises by altering and adjusting the replication rates of the application(s) based on the RPO goals of the IT enterprises.

SUMMARY OF THE INVENTION

A primary objective and advantage of the present invention is to reduce the RPO violations/deviations significantly in the IT enterprises. The present invention has visibility across many application(s) replicators and is in best possible position to make proactive and intelligent decisions by automatically adjusting and altering the replication rates of replicators so that consistent RPO goals are maintained across the data center of the IT enterprises.

Another object and advantage of the present invention is to maintain consistent RPO levels across data centers of IT enterprises by using application intelligence and replication intelligence information.

Another object and advantage of the present invention is the effective utilization of network bandwidth between a Production Site data centers and a Disaster Recovery Site data centers. Network bandwidth between Production Site data centers and the Disaster Recovery Site data centers is generally fixed and is shared among many application(s). Further, each replicator is allocated with a fixed network bandwidth. Along with the visibility of total network bandwidth allocated between Production Site data centers and the Disaster Recovery Site data centers, the present invention also has visibility of network bandwidth allocated for each application. More importantly, the present invention intends to dynamically allocate or de-allocate the network bandwidth based on application(s) write rate. This results in effective utilization of network bandwidth between Production Site data centers and the Disaster Recovery Site data centers.

Another object of the present invention is the reduction in the operational cost of data centres of the IT enterprises. Current systems involve an End of Day (EOD) processing and application maintenance operation that interferes with RPO maintainability across the data centers. Such EOD processing/operations generally results in spike/increase of non-transaction data causing an unnecessary noise/disturbance in the RPO maintainability of the IT enterprises. Consequently, RPO violation notification are sent to the application(s)/data center administrators leading to unnecessary overtime of the system administrators that results in additional cost in maintaining data centers. In the light of the foregoing and as per the present invention, the system administrators may configure the EOD processing schedule right before the EOD processing so that only critical components of application(s) are replicated thereby significantly reducing/minimizing the RPO violations which may be caused by replication of non-critical components of application(s) during EOD processing.

Another objective and advantage of the present invention is to provide scheduler based pause/resume capabilities for RPO computation for end of day (EOD) processing and for application administration.

Yet another objective and advantage of the present invention is to provide intelligent RPO computation methods for n-tier applications such that in the event of RPO deviation across data centers the present invention can intelligently pause the replication of the non-critical components and resume the replication of critical components of n-tier applications.

Accordingly, the exemplary embodiments of the invention include a system for proactively monitoring and maintaining a consistent recovery point objective (RPO) across data centers comprising one or more RPO Management Server logically connected to one or more Production Sites and one or more Disaster Recovery Sites (16), a Network (18) connecting the Production Site (14) and the said Disaster Recovery Site (16) wherein the said RPO Management Server is provided with at least one RPO Manager, at least one Disaster Recovery Management (DRM) system and at least one Replication Management System. The RPO Management Server(s) are configured to manage the RPO goals across data centers on scheduled basis. The Disaster Recovery Management System discussed herein is similar to the Disaster Recovery Management System disclosed in US Patent Publication No. US20060129562.

The Replication Management System may, not being limited to, manage replicators such as volume based block replicators or file based custom replicators. The DRM system, RPO Manager and the Replication Management System are the core components of the present invention that may depend on block replicator, file replicator or any other types of replicators. The Replication Management System is configured to provide asynchronous replication support and data compression support for effective utilization of network bandwidth. The RPO Manager is configured to monitor and sample the current RPO for all the application(s).

In addition, the exemplary embodiments of the invention include a method for proactively and intelligently monitoring and maintaining a consistent Recovery Point Objective (RPO) across data centers, the method comprising the steps of: prompting the RPO Manager to select an appropriate RPO computation method. The RPO computation method may, not being limited to, be Application RPO computation or Data RPO computation.

Application RPO computation may include monitoring and/or computing of RPO from multiple tiers of an application. For example, in case of n-tier web application the RPO of critical and non-critical components such as, not being limited to, web-servers, application-servers, database servers are monitored.

However, for Data RPO computation, RPO is monitored and/or computed only for the critical component of n-tier web application. For example, in case of n-tier application, the RPO may be monitored only for database servers.

As a next step, the RPO Manager is prompted to fetch the input RPO and current RPO for all the application(s) by the Disaster Recovery Management (DRM) System. Thereafter, the RPO Manager is prompted to check periodically if the current RPO of the application(s) is closer to or above configured RPO threshold. In case the current RPO of the application(s) is not closer to or above the configured RPO threshold, the RPO Manager may periodically repeat steps from the start.

However, in case the current RPO of the application(s) is closer to or above the configured RPO threshold, the RPO Manager is prompted to check if the RPO computation method for the application(s) is Application RPO computation and if the said Application RPO computation is paused for the said scheduled window of End of Day (EOD) processing or application administration.

If the RPO computation method for the application(s) is Application RPO computation and if the application RPO computation for the application is not paused for the said scheduled window of End of Day (EOD) processing or application administration, the RPO Manager is prompted to switch the RPO computation method from Application RPO computation to Data RPO computation. Switching the RPO computation method from Application RPO computation to Data RPO computation, pauses the replication for the non-critical components of the application(s) and resumes/starts the replication for the critical components of n tier application(s).

After selecting the RPO computation method for application(s) for the said scheduled window of End of Day (EOD) processing or application administration, the RPO Manager is prompted to fetch the replicators data transfer rate and priority of all the application(s) from the Disaster Recovery Management (DRM) system. The RPO Manager is further prompted to fetch the Replicators data lag reading and Replicator's network bandwidth utilization settings of all the application(s) from the Replication Management System.

After fetching the above-identified information for all the applications, the RPO Manager is prompted to calculate the RPO deviation for all the application(s).

The RPO Manager, after calculation of RPO deviation for all the application(s), shortlists top "n" application for which the replication rates have to be adjusted. The criterion to pick top "n" application(s) is based on if the current RPO reading for applications is "k"% closer to the input RPO. The value of "n" and "k" are configurable and can be configured by the user or the system administrators. The RPO Manager, after short listing the top "n" applications is prompted to check if the replication of the said shortlisted applications is paused and if such applications are low priority applications with huge data lag.

If the replication of the said shortlisted applications is paused and such applications are low priority applications with huge data lag, the replication of such shortlisted applications is resumed. Once the replication of the said shortlisted applications is resumed, the system resumes the management of RPO levels from the 'Start'.

However, if the replication of the said shortlisted applications is not paused and the data lag of such applications is zero, the RPO manager is prompted to select bottom "N" applications with high data transfer rate and having RPO deviation below "M"%. After selection of bottom "N" applications having RPO deviation below "M"% and having a high data transfer rate, the RPO Manager is prompted to check for high priority application(s) in the said bottom "N" applications. If high priority applications are found in the said "N" applications and it is not a peak application hour, the replicator's network bandwidth utilization for the said high priority applications is decreased and the system resumes the management of RPO levels from the 'Start'.

At this step, application(s) may also be configured so that RPO Manager is not prompted to alter the network bandwidth in peak application hours by assigning the appropriate application priority. After checking the selected bottom "N" applications for high priority applications, the RPO Manager is further prompted to check for low priority applications in the said "N" applications. If low priority applications are found with the application data transfer rate greater than or equal to the allocated network bandwidth of the replicator, the RPO manager is prompted to either initiate the data compression of the data being transferred or the replication of the said low priority applications is paused till the next RPO sampling. After the said low priority applications are either paused or application data of such low priority applications is compressed, the system is prompted to resume the management of RPO levels from the 'Start'.

BRIEF DESCRIPTION OF THE ACCOMPANYING DRAWINGS

DETAILED DESCRIPTION OF THE INVENTION

The exemplary embodiments of the present invention provide a system and method for proactively and intelligently monitoring and maintaining consistent RPO levels in IT enterprises by altering and adjusting the replication rates of the application(s) based on the RPO goals of IT enterprises.

Figure 1:
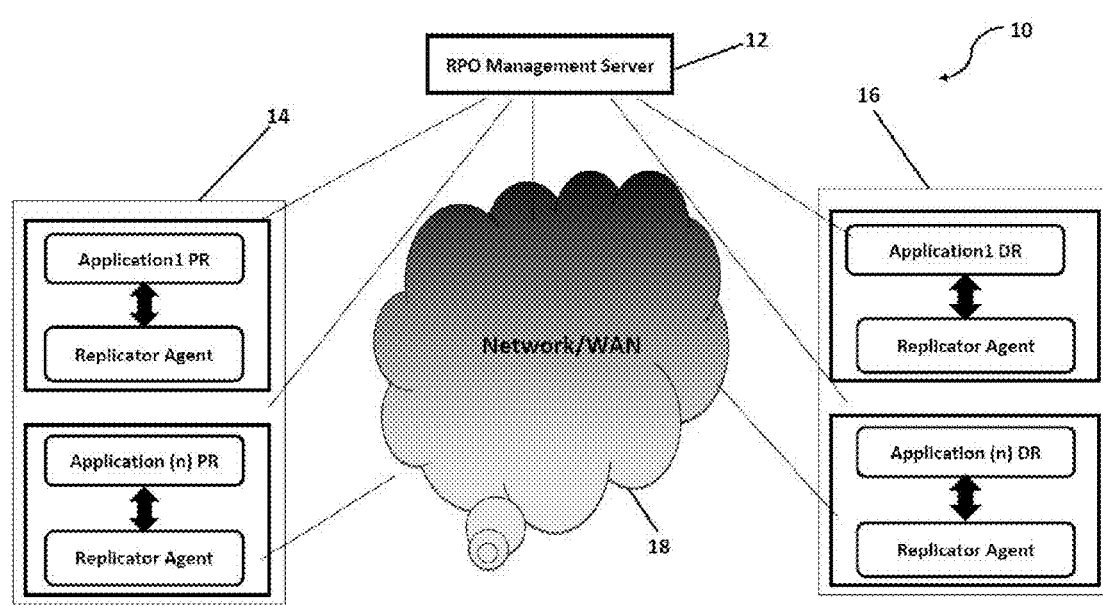
FIG. 1 is a diagram illustrating an exemplary environment in which the system for proactively and intelligently monitoring and managing consistent RPO goals of an IT enterprise according to the present invention operates.

FIG. 1 is a diagram illustrating an exemplary environment in which the system 10 for proactively and intelligently monitoring and maintaining consistent RPO goals of an IT enterprise operates. As illustrated, the system 10 is provided with a RPO Management Server 12 for proactively and intelligently monitoring and maintaining RPO goals across data centers of an IT enterprise. One or more RPO Management Servers 12 may be provided in the system 10 for proactively and intelligently monitoring and maintaining RPO goals across data centers.

The system 10 is further provided with one or more Production Site 14 and one or more Disaster Recovery Site 16. The Production Site 14 is provided with one or more data centers where production server(s) and application(s) run. The Disaster Recovery Site 16 is also provided with one or more data centers having DR server(s) and application(s).

The system 10 further comprises a Network 18 connecting the said Production Site 14 and the said Disaster Recovery Site 16. The RPO Management Server 12 is logically coupled to the Production Site 14, the Disaster Recovery Site 16 and the Network 18 connecting the said Production Site 14 and the Disaster Recovery Site 16. The logical connection may be an IP network connection or connection already known in the art.

One or more application(s) of the IT enterprise that are required to be available continuously run on one or more first computers 20 at the Production Site 14. Data protection scheme are also configured to protect the application(s) running on one or more first computers 20 at the Production Site 14.

The application(s) and data protections schemes available at the Production site 14 may run on one or more second computers 22 at the Disaster Recovery Site 16. One or more storage units 24 may be connected to the first computers 20 and the second computers 22 at the Production Site 14 and the Disaster Recovery Site 16. Operating systems running on the first computers 20 and the second computer 22 support operations of an IT enterprise's business continuity or Disaster Recovery solutions.

As shown in FIG. 1, one or more application(s) run on the said first computers 20 along with their replication agents in the Production Site 14 as well as one or more application(s) run on the said second computers 22 along with their replication agents in the Disaster Recovery Site 16. The RPO Management Server 12 will be responsible for managing the RPO goals of such multiple application(s) using the methods discussed herein.

A plurality of agents of the RPO Management Server 12 may be deployed on elements of the Production Site 14 and the Disaster Recovery Site 16 to continuously monitor the changes at the Production Site 14 and the Disaster Recovery Site 16 and provide a real time status to the RPO Management Server 12. The elements of the Production Site 14 and the Disaster Recovery Site 16 may, not being limited to, include elements such as servers, databases, application(s), network switches, storage devices, or the like etc. The said agents of the RPO Management Server 12 are used to continuously monitor the changes at the Production Site 14 and the Disaster Recovery Site 16 and provide a real time status to the RPO Management server 12.

Applications in the Production Site 14 and their copies in Disaster Recovery Site 16 may include, not being limited to, databases, file systems, web servers, infrastructure, applications like DNS, active directory and other custom software used by the enterprise customers, or the like etc.

Figure 2:
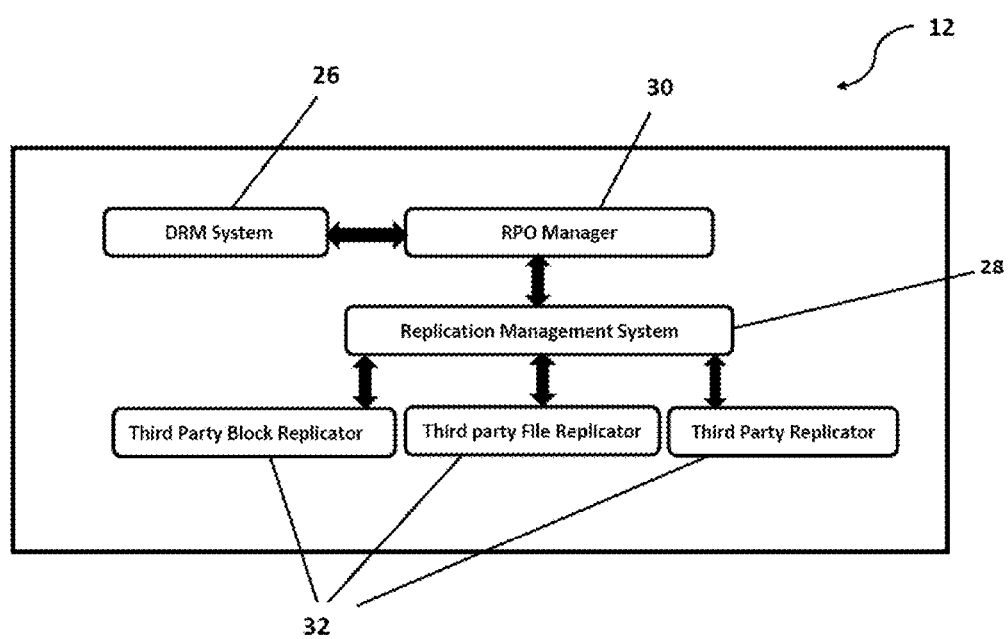
FIG. 2 is a diagram illustrating the components of the RPO Management Server according to the present invention.

FIG. 2 illustrates the components of the RPO Management Server 12 such as, not being limited to, a Disaster Recovery Management system 26, Replication Management system 28 and a RPO Manager 30.

The Disaster Recovery Management (DRM) System 26 may, not being limited to, be used to provide input RPO value for the application(s), current RPO for each application, replication set information, Peak/Non-Peak bandwidth utilization hours, maintenance schedule of application(s) and priority of application(s). The Disaster Recovery Management System 26 discussed herein is similar to the system for management of Recovery Point Objective (RPO) of a business continuity or disaster recovery solution disclosed in US Patent Publication No. US20060129562.

The RPO Manager 30 is responsible, not being limited to, for monitoring and sampling of the current RPO for all the application(s) across the data centers of the IT enterprises. RPO sampling schedule varies based on the business priority of the application(s) such as, not being limited to, critical, high and low priority application(s). RPO sampling may be scheduled, not being limited to, every few seconds, every few minutes or every few hours. The RPO Manager 30 may further compute and shortlist application(s) for which the replication rates needs to be adjusted. The RPO Manager 30 may also adjust the replication rates of the replicators 32 working with the Replication Management System 28. The RPO Manager 30 may also be responsible for scheduler based pause/resume capabilities for RPO computation for end of day (EOD) processing or the like.

The Replication Management System 28 may, not being limited to, manage replicators 32 such as volume based block replicators 32 or file based custom replicators 32. The said Replication Management System 28 may create replication pair from the source and target applications. The said Replication Management System 28 may also act as an interface between RPO Manager 30 and replicators 32. The said Replication Management System 28 may provide, not being limited to, asynchronous replication support, data compression support for effective utilization of network bandwidth or the like etc.

The input to RPO Management Server 12 for maintaining the consistent RPO levels across data center in the IT enterprise may, not being limited to, be the, desired RPO, current RPO, data transfer rate, data lag reading, priority settings, peak/non-peak RPO thresholds and network bandwidth setting. A user or system administrator may be prompted to enter a desired RPO value. According to the embodiments of the present invention, the user or administrator may be prompted to enter a desired RPO value for either the entire solution or an application thereof, via a graphical user interface (GUI).

The action that RPO Manager 30 of the RPO Management Server 12 takes to maintain consistent RPO levels is adjustment of the network bandwidth utilization setting for replicators 32 based on application priority and peak/non-peak hours.

The RPO Manager 30 also determines applications for which the data replication needs to be paused/resumed for some time or initiate the data compression based on the application priority level.

FIGS. 3A-3G show a flow chart illustrating the method to monitor and maintain the RPO goals across the data centers, the method comprising steps of: selecting an configuring an appropriate RPO computation method for the system 10 at step 100. The RPO computation methods may, not being limited to, include Data RPO computation or Application RPO computation.

The application RPO computation includes RPO from multiple tiers of application(s). For example, in case of n-tier web application(s), the RPO is monitored for the critical as well as non-critical components of the application(s) such as web servers, application servers, database servers, or the like etc.

However, for Data RPO computation, RPO is monitored only for the critical components of the application(s). For example, in case of n tier applications, it may include only database server(s). Data RPO computation focuses on the database RPO. Application RPO focuses across tiers of application(s). Data RPO computation uses database level business transaction details to compute the data RPO. Application RPO computation requires user or administrator to provide data points for each tier of application.

Figure 3A:
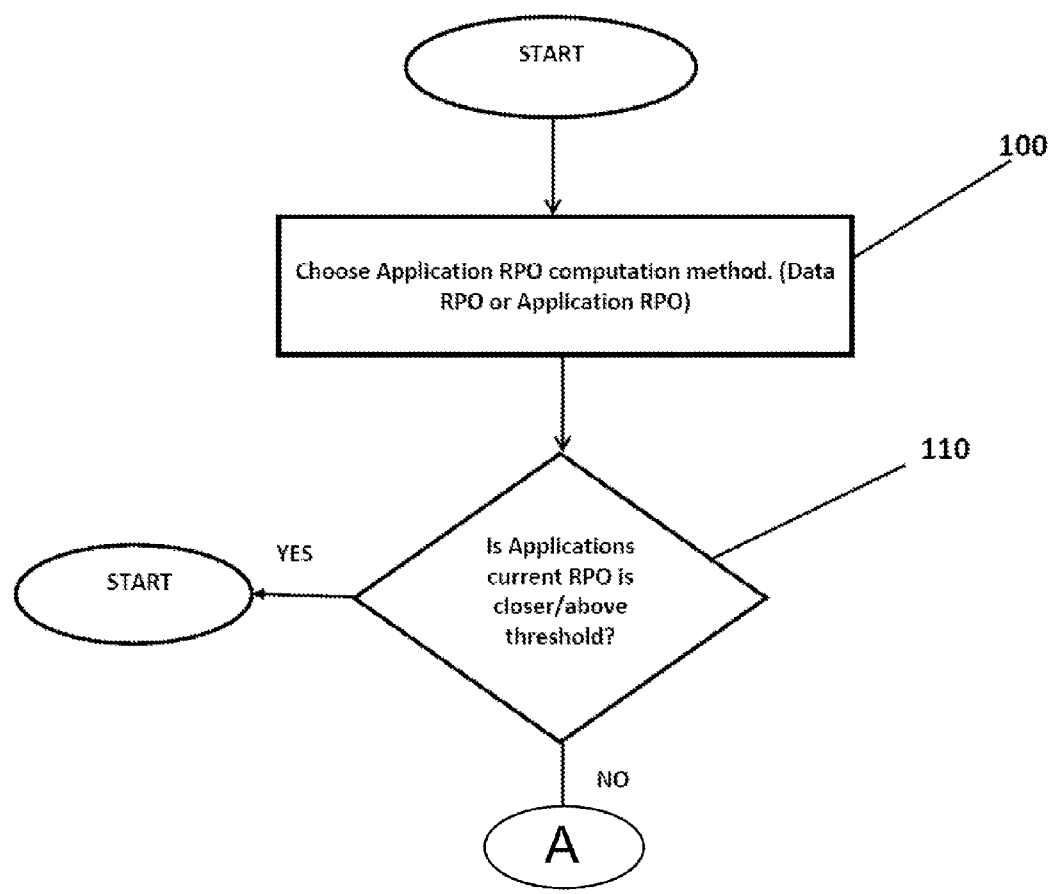
FIGS. 3A-3G show a Flow Chart illustrating the steps involved in proactively and intelligently monitoring and maintaining consistent RPO goals of an IT enterprise according to the present invention.

As illustrated in FIG. 3A; thereafter, at step 110, the RPO Manager 30 is prompted to check periodically if the current RPO of the application(s) is closer to or above the configured threshold RPO of the application(s). The current RPO and configured RPO for each application is fetched by the RPO Manager 30 from the Disaster Recovery Management (DRM) System 26.

Figure 3B:
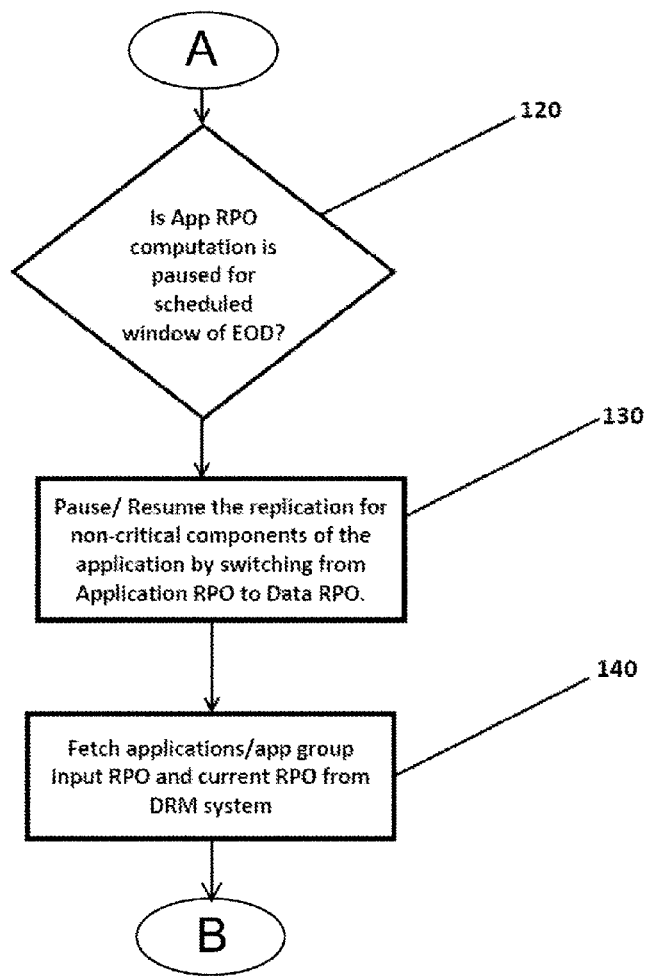

As illustrated in FIG. 3B at step 120, the RPO Manager 30 is prompted to further check if the Application RPO computation is paused for End of day (EOD) processing or application administration window. In one embodiment, if the system is configured to pause the Application RPO computation for End of day (EOD) processing, the system 10 may repeat the steps from step 100. According to another embodiment, the system may resume from step 140 discussed herein. However, if the system 10 is not configured to pause the Application RPO computation for scheduled window of End of day (EOD) processing or application administration, the system moves to step 130.

As illustrated in FIG. 3B at step 130, the RPO Manager 30 may be configured to pause the Application RPO computation for the scheduled window of End of day (EOD) processing or application administration, if there is an RPO deviation and the RPO computation method is Application RPO. Such Application RPO computation is paused to ensure that the scheduled End of day (EOD) processing or administration operations are not interfering with the RPO maintainability of the IT enterprises.

The End of day (EOD) processing or application administration operations of IT enterprises generate lots of Meta data or non-transaction data that need not be critical in the event of Disaster Recovery. The said spike/increase of non-transaction data during the End of Day (EOD) processing may cause an unnecessary noise/disturbance in the RPO maintainability of the IT enterprises.

In the event of RPO deviation, pausing the Application RPO computation entails switching of Application RPO computation to Data RPO computation wherein the RPO Manager 30 may determine to pause the replication of non-critical components of the n-tier applications and continue/resume the replication of the critical component of the n-tier applications. Such decisions by RPO Manager 30 entail the applications to maintain the configured RPO across data centers of IT enterprises. Before pausing the application RPO computation for application(s), a Disaster Recovery database or component clone may be taken so that in the event of disaster, the said clone may be used for disaster recovery.

As illustrated in FIG. 3B; at step 140, the RPO Manager 30 is prompted to fetch the input RPO and current RPO for all the application(s) from the Disaster Recovery Management (DRM) System 26.

Figure 3C:
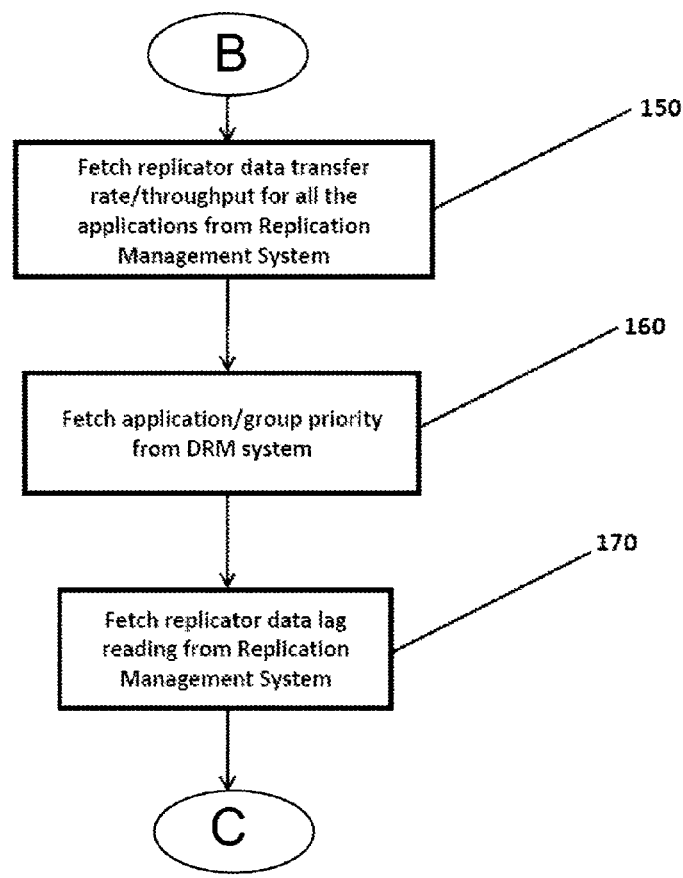

As illustrated in FIG. 3C at step 150, the RPO Manager 30 is prompted to fetch the replicator data transfer rate for the application(s) from the Replication Management System 28.

As illustrated in FIG. 3C; thereafter, at step 160, the RPO Manager 30 is prompted to fetch the priority of all the application(s) from the Disaster Recovery Management (DRM) System 26.

As illustrated in FIG. 3C at step 170, the RPO Manager 30 is prompted to fetch the replicator lag reading of all the application(s) by the Replication Management System 28.

Figure 3D:
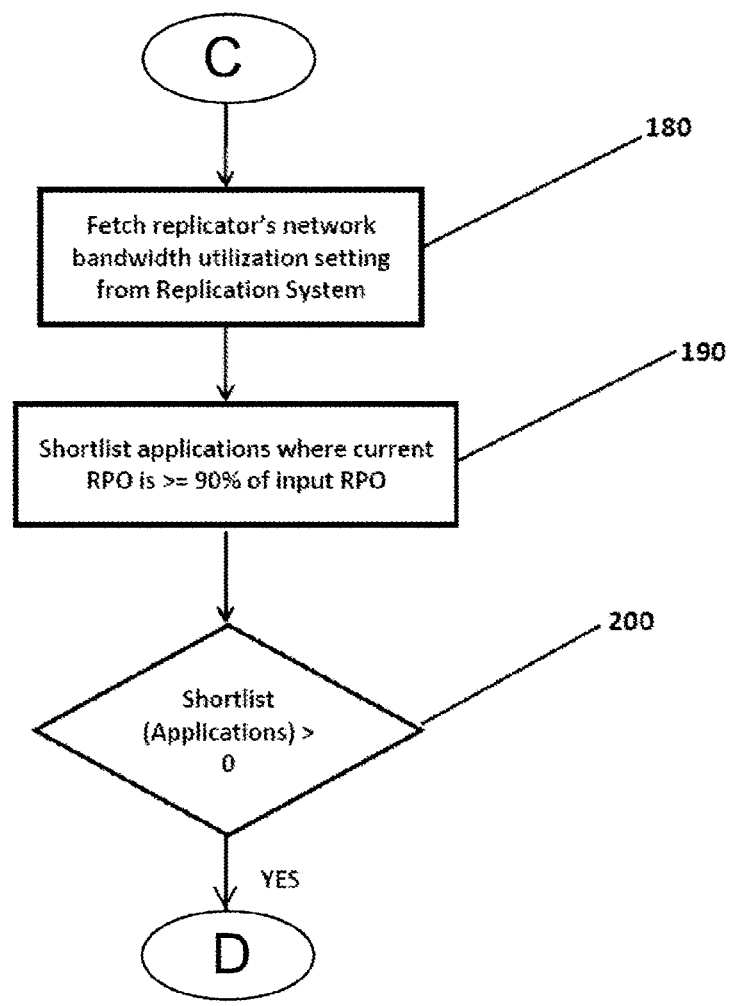

As illustrated in FIG. 3D at step 180, the RPO Manager 30 is prompted to fetch the replicator's network bandwidth utilization settings for all the application(s) from the Replication Management System 28.

As illustrated in FIG. 3D; thereafter, at step 190, the RPO Manager 30 is prompted to calculate the RPO deviation for all the application(s) using a RPO deviation formula.

As illustrated in FIG. 3D at step 200, the RPO Manager 30 is prompted to shortlist top "n" application(s) from the output of step 190 for which the replication rates have to be adjusted. The criterion to shortlist top "n" application(s) is based on the current RPO reading being "k"% closer to the input RPO goals. According to the embodiments of the invention, the formula to pick top "n" applications may, not being limited to, be:

Current RPO>="k"% of (input RPO) wherein "k" is 90%

The parameter 'k' of the above formula is configurable and can be configured as per the requirements of the IT enterprises.

The variable "n" is configurable. According to the embodiments of the invention, the default value of "n" is 3.

Figure 3E:
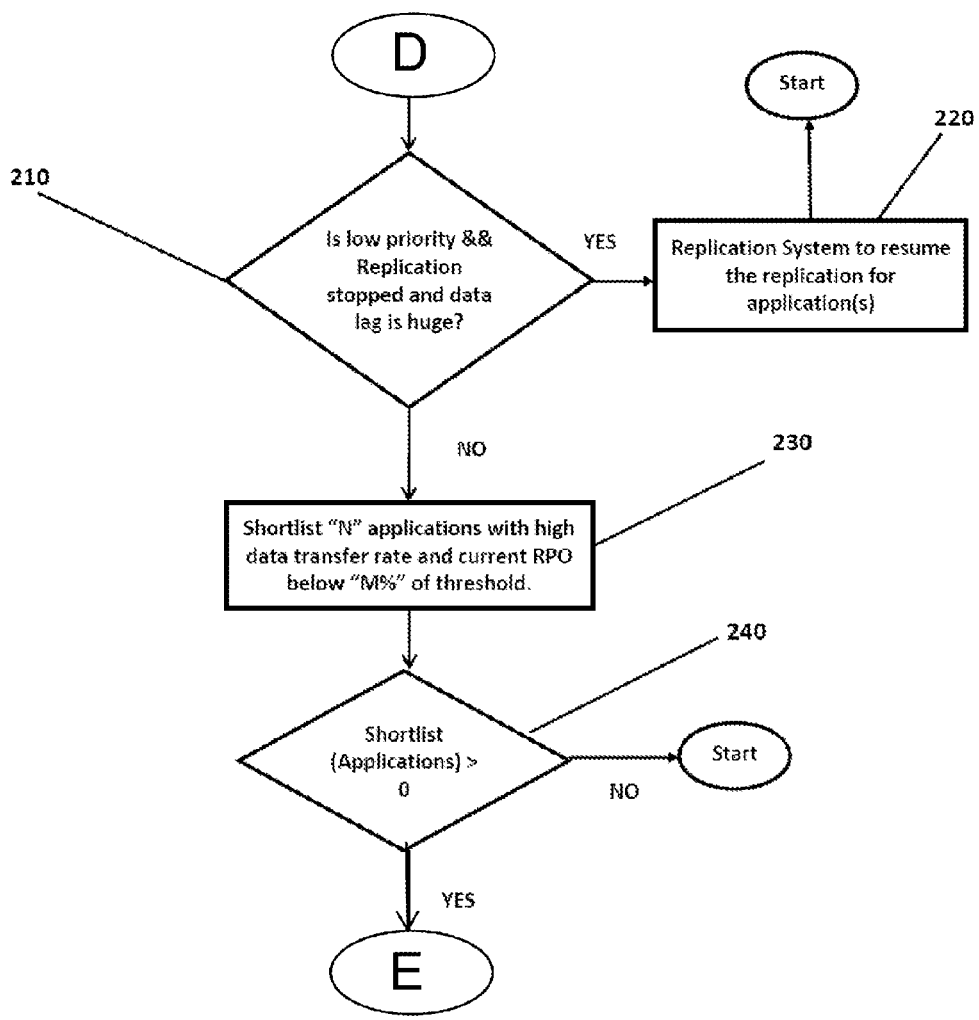

As illustrated in FIG. 3E; thereafter, at step 210, the RPO Manager 30 is prompted to check if the selected "n" application(s) are low priority applications having paused replications and huge data lag. If low priority applications with paused replication and huge data lags are found in the "n" application(s), the system 10 moves to step 220. However, if low priority application(s) with paused replication and huge data lags are not found, the system moves to step 230.

As illustrated in FIG. 3E at step 220, the RPO Manager 30 is prompted to resume the replication of low priority application(s) with paused replication and huge data lag. After the replication of the said shortlisted applications is resumed, the system 10 resumes the management of RPO levels from step 100. According to another embodiment, the system may resume from step 140 discussed herein.

As illustrated in FIG. 3E at step 230, the RPO Manager 30 is prompted to select bottom "N" applications from the output of Step 190 having high data transfer rate and RPO deviation below "M"%. The value of "N" and "M" are configurable and can be configured as per the requirements of the IT enterprises. According to the embodiments of the present invention, the value of "N" is equal to 3 and value of "M" is 50%.

As illustrated in FIG. 3E at step 240, if the application(s) selected at step 230 are zero, the RPO Manager 30 is prompted to resume the management of RPO levels from step 100. According to another embodiment, the system may resume from step 140 discussed herein However, if the applications selected at step 230 are greater than zero, the system moves to step 250.

Figure 3F:
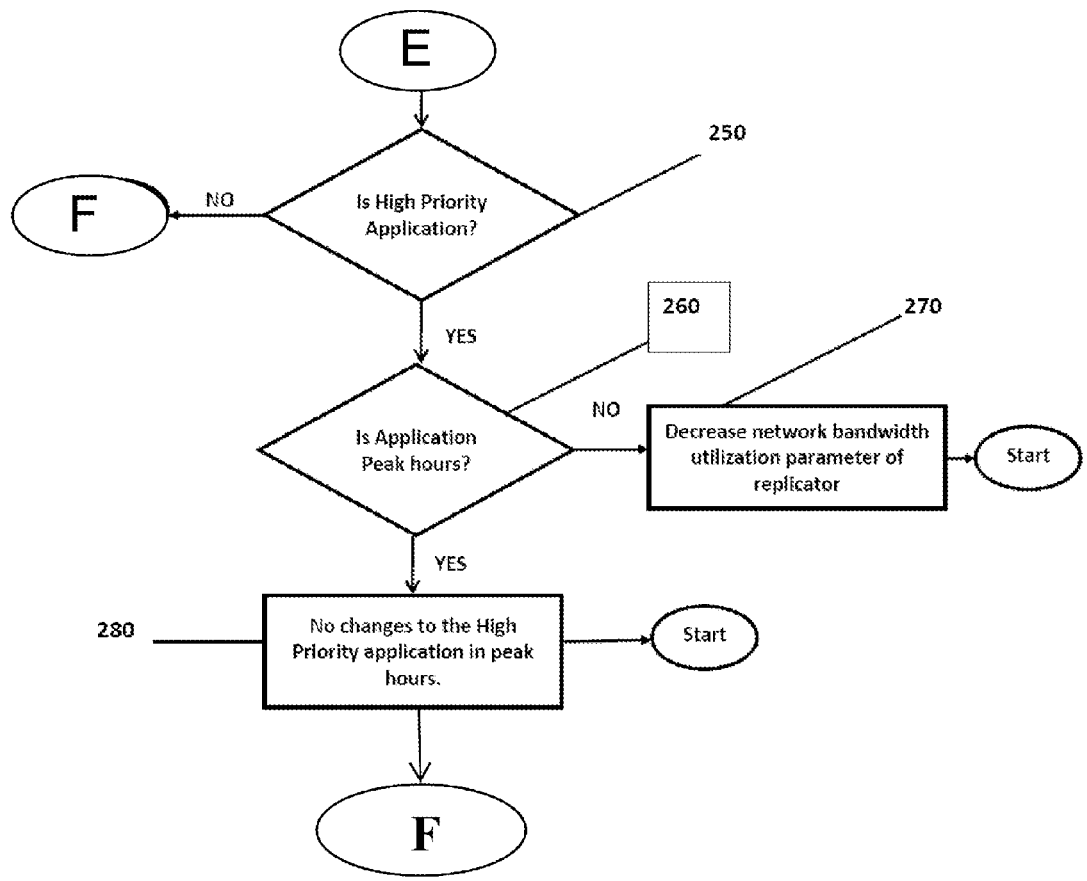

As illustrated in FIG. 3F at step 250, the RPO Manager 30 is prompted to check for high priority applications in the selected "N" application(s) at step 230. If the high priority application(s) are found, the RPO Manager 30 is prompted to check if it is the application peak hour at step 260. If it is an application peak hour, the system 10 moves to step 280. However, if it is not the peak application hour, the RPO Manager 30 is prompted to move to step 270.

As illustrated in FIG. 3F; thereafter, at step 270, the RPO Manager 30 decreases the network band width utilization parameter of the replicators 32 replicating the application data of such high priority application(s) at step 270. The system 10 is configured such that the network band width utilization parameters of high priority applications are altered only during non-peak application hours and remain unchanged during the application peak hours. Upon completion of step 270, the system 10 resumes the management of RPO levels from step 100. According to another embodiment, the system may resume from step 140 discussed herein.

As illustrated in FIG. 3F at step 280, the RPO Manager 30 is further prompted to check for low priority application(s) in the selected "N" application(s). If low priority application(s) are found in the "N" application(s), the RPO manager is prompted to check if the application data write rate of the said low priority applications is greater than or equal to allocated network band width of the replicator 32. If the application data write rate of the said low priority applications is greater than or equal to allocated network band width of the replicator 32, the system goes to step 310. If the application data write rate of the said low priority applications is not greater than or equal to allocated network band width of the replicator 32, the system goes to step 300.

Figure 3G:
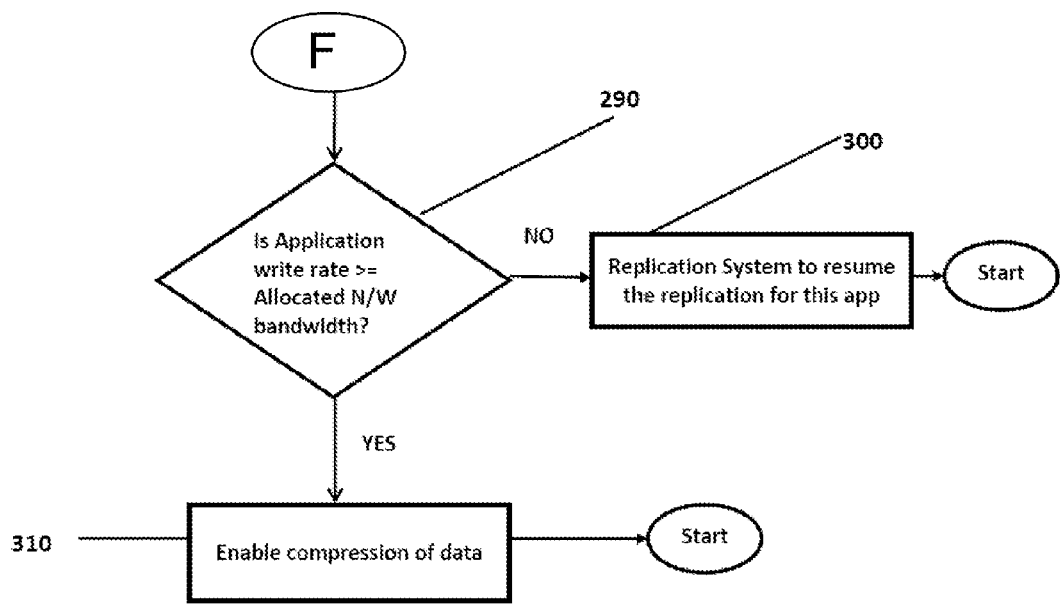

As illustrated in FIG. 3G at step 310, the RPO Manager 30 is prompted to initiate/enable the data compression of such low priority application(s) and resume the management of RPO levels from step 100. According to another embodiment, the system may resume from step 140 discussed herein.

As illustrated in FIG. 3G at step 300, the RPO manager is prompted to the pausing the replication of such low priority application(s) till the next RPO sampling and resumes the management of RPO levels from step 100. According to another embodiment, the system may resume from step 140 discussed herein.

In various embodiments of the present invention, the system and method herein can operate in varied environment and on heterogeneous platforms such as heterogeneous servers and operating systems environments.

While the present invention has been shown and described with reference to exemplary embodiments, it will be understood by those skilled in the art that various changes in form and detail may be made therein without departing from or offending the spirit and scope of the invention as defined by the appended claims.

Although this invention has been disclosed in the context of certain preferred embodiments and examples, it will be understood by those skilled in the art that the present invention can be constructed and utilized in a plethora of different ways. It should be understood that many changes, modifications, variations and other uses and applications will become apparent to those persons skilled in this particular area of technology and to others after having been exposed to the present specification and accompanying drawings. Any and all such change, modifications, variations, and other uses and applications which do not depart from the spirit and scope of the present invention are therefore covered by and embraced within the present invention and the patent claims set forth herein-below.

LIST OF REFERENCE NUMERALS

10 System
12 RPO Management Server
14 Production Site
16 Disaster Recovery Site
18 Network
20 First Computer
22 Second Computer
24 Storage Unit
26 Disaster Recovery Management (DRM) System
28 Replication Management System
30 RPO Manager
32 Replicators

We claim:

1. A method for proactively monitoring and maintaining a consistent recovery point objective (RPO) across data centers comprising a plurality of computers, the method comprising the steps of:
    providing a plurality of different RPO computation methods including a data RPO computation for monitoring and/or computing RPO of only critical components of applications and an application RPO computation for monitoring and/or computing RPO from both critical and non-critical components of applications for use by a RPO manager executing on an RPO management server comprising one or more computers;
    RPO Manager executing on the RPO management server selecting an appropriate RPO computation method for the system from the plurality of different RPO computation methods;

the RPO Manager executing on the RPO management server fetching the input RPO or threshold RPO for the application(s);

the RPO manager executing on the RPO management server requesting the input RPO or threshold RPO from the Disaster Recovery Management (DRM) System via a network interface;

the RPO manager executing on the RPO management server requesting the current RPO for the application(s) from the Disaster Recovery Management (DRM) System;

the Disaster Recovery Management System sending the current RPO for the application(s) to the RPO manager executing on the RPO management server;

the RPO Manager executing on the RPO management server determining if the current RPO of the application(s) is closer to the configured threshold RPO;

the RPO manager executing on the RPO management server checking whether the RPO computation method allocated during scheduled window of EOD processing or administration operations is application RPO computation;

the RPO Manager executing on the RPO management server pausing the replication of non-critical components of application(s) if the current RPO of the application(s) is closer to the said configured threshold RPO and the said allocated RPO computation method is application RPO computation; and the RPO Manager executing on the RPO management server resuming the replication of critical components of application(s) if the current RPO of the application(s) is closer to the said configured threshold RPO and the said allocated RPO computation method is application RPO computation.

2. The method as claimed in claim 1, the method further comprising the steps of:
   (a) prompting the RPO Manager to fetch the input RPO or threshold RPO and current RPO for the application(s) from the Disaster Recovery Management (DRM) System;
   (b) prompting the RPO Manager to fetch the priority of application(s) from Disaster Recovery Management (DRM) System;
   (c) prompting the RPO Manager to fetch replicator data transfer rate for the application(s) from the Replication Management System;
   (d) prompting the RPO Manager to fetch replicator data lag reading from the said Replication Management System;
   (e) prompting the RPO Manager to calculate the RPO deviation for the said application(s);
   (f) prompting the RPO Manager to check application(s) having current RPO greater than or equal to "k" percentage of input RPO (where "k" is a particular value);
   (g) prompting the RPO Manager to shortlist top "n" applications checked at step (f);
   (h) prompting the RPO Manager to check for low priority application(s) from the a number "n" of shortlisted application(s) with paused replication rates and huge data lag;
   (i) prompting the RPO Manager to resume the replication of low priority applications checked at step (h);
   (j) prompting the RPO Manager to resume the process from the step of selection of an appropriate computation method for the system or from the step of fetching the current RPO and threshold RPO for applications by RPO Manager subsequent to the replication of low priority applications at step (i).

3. The method as claimed in claim 2, the method further comprising the steps of:
   (a) prompting the RPO Manager to check application with high data transfer rate and current RPO value below "M" percentage of the said RPO threshold value (where "M" is a particular value) if no low priority applications are obtained from shortlisted "n" applications;
   (b) prompting the RPO Manager to resume the management of RPO levels from selection of an appropriate window for End of Day (EOD) processing if no applications found at step (a) with high data transfer rate and current RPO value below "M" percentage of the threshold value;
   (c) prompting the RPO manager to shortlist bottom "N" applications (where "N" is a number of such applications) if applications found at step (a) have high data transfer rate and current RPO value below "M" percentage of the said RPO threshold value;
   (d) prompting the RPO Manager to check the shortlisted "N" applications for high priority applications;
   (e) prompting the RPO Manager to check for application(s) peak hours;
   (f) prompting the RPO Manager to alter the network bandwidth utilization parameters of replicators for high priority applications checked during non-peak application(s) hours;
   (g) prompting the RPO Manager to resume the process from the step of selection of an appropriate computation method for the system or from the step of fetching current RPO and threshold RPO for applications for applications by the RPO Manager after the said network bandwidth utilization parameters of replicators are altered at step (f);
   (h) prompting the RPO Manager to not alter the network bandwidth utilization parameters of replicators for high priority applications during peak application(s) hours;
   (i) prompting the RPO Manager to resume the process from the step of selection of an appropriate computation method for the system or from the step of fetching current RPO and threshold RPO for applications by the RPO Manager after the said network bandwidth utilization parameters of replicators are not altered at step (h).

4. The method as claimed in claim 3, the method further comprising the steps of:
   (a) prompting the RPO Manager to check the shortlisted "N" application(s) for low priority applications if no high priority application(s) are found;
   (b) prompting the RPO manager to calculate application write rate for low priority applications found at step (a);
   (c) prompting the RPO Manager to initiate data compression if the application write rate for said low priority application(s) is greater than or equal to allocated network bandwidth for the said low priority application(s);
   (d) prompting the RPO Manager to resume the process from the step of selection of an appropriate computation method for the system or from the step of fetching current RPO and threshold RPO for applications by the RPO Manager after the said compression of data at step (c);
   (e) prompting the RPO Manager to pause the replication of the said low priority application(s) if the application write rate is lesser than or equal to allocated network bandwidth for the said low priority application(s);

(f) prompting the RPO Manager to resume the process from the step of selection of an appropriate computation method for the system or from the step of fetching current RPO and threshold RPO for applications by the RPO Manager after the said replication of the said low priority application(s) at step (e) is paused.

5. The method as claimed in claim 2, wherein the value of "k", "n", "N" and "M" are configurable.

6. The method as claimed in claim 5, wherein the value of "n" and "N" is equal to 3.

7. The method as claimed in claim 5, wherein the value of "k" percent is 90%.

8. The method as claimed in claim 5, wherein the value of "M" percent is 50%.

9. A method for proactively monitoring and maintaining a consistent recovery point objective (RPO) across data centers comprising a plurality of computers, the method comprising the steps of:
providing a plurality of different RPO computation methods including a data RPO computation for monitoring and/or computing RPO of only critical components of applications and an application RPO computation for monitoring and/or computing RPO from both critical and non-critical components of applications for use by a RPO manager executing on an RPO management server comprising one or more computers;
RPO Manager executing on the RPO management server selecting an appropriate RPO computation method for the system from the plurality of different RPO computation methods;
the RPO Manager executing on the RPO management server fetching the input RPO or threshold RPO for the application(s);
the RPO manager executing on the RPO management server requesting the input RPO or threshold RPO from Disaster Recovery Management (DRM) System comprising a plurality of computers interacting with the RPO manager via a network interface;
the RPO manager executing on the RPO management server requesting a current RPO for the application(s) from the Disaster Recovery Management (DRM) System;
the Disaster Recovery Management System sending the current RPO for the application(s) to the RPO manager executing on the RPO management server;
the RPO Manager executing on the RPO management server determining if the current RPO of the application(s) is closer to the configured threshold RPO;
the RPO manager executing on the RPO management server checking whether the RPO computation method allocated during scheduled window of EOD processing or administration operations is application RPO computation;
the RPO Manager executing on the RPO management server pausing the replication of non-critical components of application(s) if the current RPO of the application(s) is closer to the said configured threshold RPO and the said allocated RPO computation method is application RPO computation; and
the RPO Manager executing on the RPO management server resuming the replication of critical components of application(s) if the current RPO of the application(s) is closer to the said configured threshold RPO and the allocated RPO computation method is application RPO computation, wherein
the RPO Manager executing on the RPO management server provides scheduler based pause/resume capabilities for RPO computation for end of Day (EOD) processing and for application administration window.

10. A method for proactively monitoring and maintaining a consistent recovery point objective (RPO) across data centers comprising a plurality of computers, the method comprising the steps of:
providing a plurality of different RPO computation methods including a data RPO computation for monitoring and/or computing RPO of only critical components of applications and an application RPO computation for monitoring and/or computing RPO from both critical and non-critical components of applications for use by a RPO manager executing on an RPO management server comprising one or more computers system;
RPO Manager executing on the RPO management server selecting an appropriate RPO computation method for the system from the plurality of different RPO computation methods;
prompting the RPO Manager executing on the RPO management server fetching the input RPO or threshold RPO for the application(s);
the RPO manager executing on the RPO management server requesting the input RPO or threshold RPO from the Disaster Recovery Management (DRM) System comprising a plurality of computers interacting with the RPO manager via a network interface;
the RPO manager executing on the RPO management server requesting the current RPO for the application(s) from the Disaster Recovery Management (DRM) System;
the Disaster Recovery Management System sending the current RPO for the application(s) to the RPO manager executing on the RPO management server;
the RPO Manager executing on the RPO management server determining if the current RPO of the application(s) is closer to the configured threshold RPO;
the RPO manager executing on the RPO management server checking whether the RPO computation method allocated during scheduled window of EOD processing or administration operations is application RPO computation;
the RPO Manager executing on the RPO management server pausing the replication of non-critical components of application(s) if the current RPO of the application(s) is closer to the configured threshold RPO and the allocated RPO computation method is application RPO computation; and
the RPO Manager executing on the RPO management server resuming the replication of critical components of application(s) if the current RPO of the application(s) is closer to the said configured threshold RPO and the said allocated RPO computation method is application RPO computation, wherein
the RPO Manager executing on the RPO management server is configured to provide intelligent RPO computation methods for application(s).

* * * * *